(No Model.)  
B. S. LOVELAND.  
SAW GAGE.  
No. 434,284.   Patented Aug. 12, 1890.  
2 Sheets—Sheet 2.
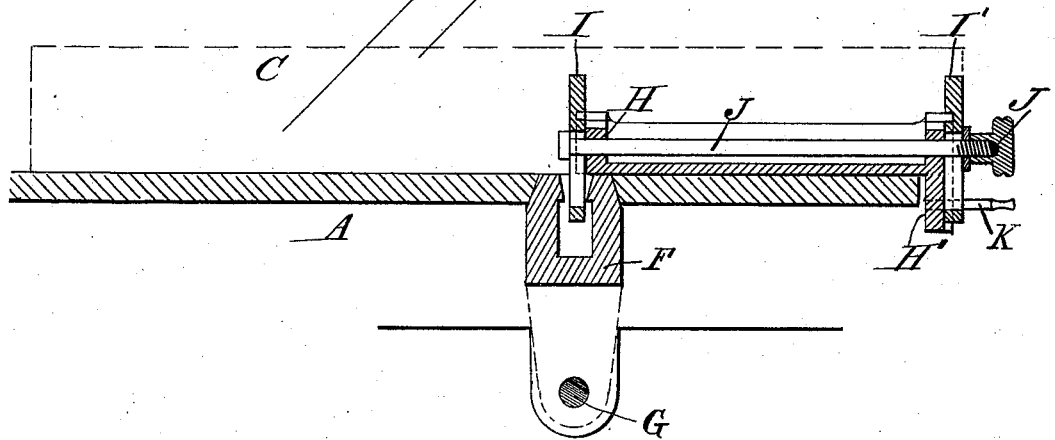
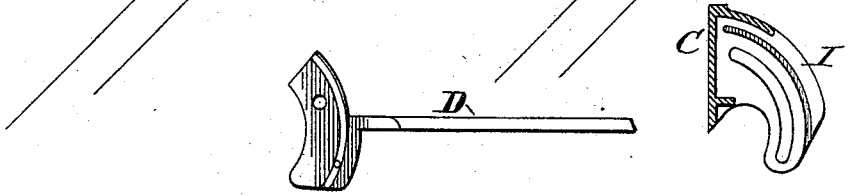
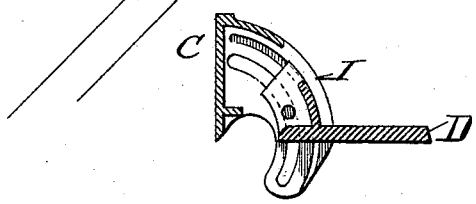
Attest:  
F. H. Schott  
Fred E. Tasker.
Inventor,  
Byron S. Loveland,  
per John C. Tasker, atty

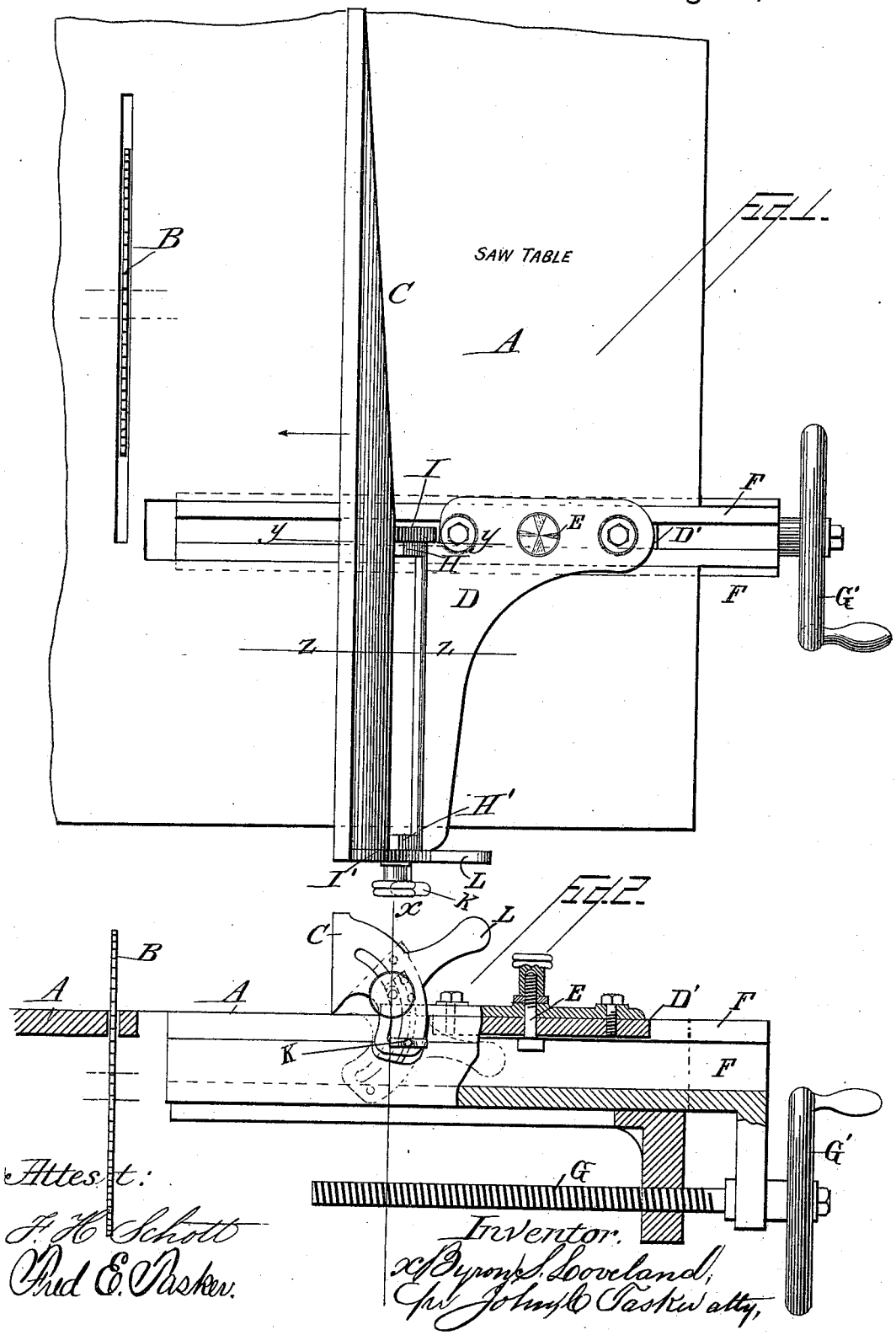

UNITED STATES PATENT OFFICE.

BYRON S. LOVELAND, OF WINCHENDON, MASSACHUSETTS, ASSIGNOR TO BAXTER D. WHITNEY, OF SAME PLACE.

SAW-GAGE.

SPECIFICATION forming part of Letters Patent No. 434,284, dated August 12, 1890.

Application filed May 12, 1890. Serial No. 351,498. (No model.)

*To all whom it may concern:*

Be it known that I, BYRON S. LOVELAND, a citizen of the United States, residing at Winchendon, in the county of Worcester and State of Massachusetts, have invented certain new and useful Improvements in Saw-Gages; and I do hereby declare the following to be a full, clear, and exact description of the invention, such as will enable others skilled in the art to which it appertains to make and use the same.

My invention applies to sawing and other wood-cutting machines having guides for directing the movement or for regulating and determining the dimensions of material cut.

It relates more particularly to the mechanism of the guiding device technically known as a "fence" or "gage."

The purposes of the invention are to facilitate adjustment of the fence or guide plate in a horizontal or lateral direction to and from the saw, also to provide for its proper angular adjustment from a vertical to inclined position, by means which save time, promote accuracy, increase range of action, and obviate sundry disadvantages of ordinary gages.

The invention consists of certain essential features, substantially as hereinafter to be shown and described, and also in the construction, arrangement, and combination of parts, as will more fully appear in the specification and subjoined clauses of the claim.

In the accompanying drawings, Figure 1 is a plan view of the gage applied to a saw bench or table. Fig. 2 is an end elevation, with sectional view of a part of the mechanism. Fig. 3 is a vertical section at line *x x*, Fig. 2. Fig. 4 is a side elevation of the base-plate which carries the guide-plate or fence proper, showing a part of the hinge-connection at H, Figs. 1 and 3. Fig. 5 is a cross-section of the fence with one of its projecting hinge-plates at line *y y*, Fig. 1. Fig. 6 is a cross-section of the fence and its base-plate at line *z z*, Fig. 1, also showing the hinge-connection near line *y y*.

Like parts are denoted by similar letters in all the figures.

A represents a portion of a saw bench or table, which may be of any form or construction suited to its use, as the application of my improved gage is not limited to any special machine or work, but may be used with cutters for grooving, fluting, rabbeting, planing, &c., as well as in connection with a saw, as herein shown and described.

B denotes a saw mounted upon an arbor or mandrel beneath the surface of the table and projecting through a slit or aperture in same in the usual manner.

C is the gage-plate or fence proper, which serves to guide the material to the saw or cutter or to gage the width, thickness, or length of pieces to be cut. This is mounted upon a base-plate D by hinged connections, providing for adjustments of inclinations to different angles with the surface of the table without disturbance of the normal position of its base, thus obviating the disadvantages of ordinary tilting gages of changeable base. It is arranged to align correctly with the line of cut of the saw, also for adjustment transversely thereto, or horizontally and laterally to and from the saw. For this purpose the base-plate D is provided with a guiding way or tongue D', adapted to slide in a corresponding groove or track in a bed-piece on which it is placed, and can be readily moved throughout any portion of its range of traverse, or be securely fastened in any required position by setting the nut of a clamping-bolt E. The guideway D' is attached to plate D by means of screws, whereby the alignment of the fence can be changed, as sometimes necessary or advantageous, to compensate for trifling aberrations in the line of cut of the saw.

F is a bed-piece for plate D, which, for convenience in making minute adjustments of the fence, is adapted to slide in a suitable recess or guideways in the table. It is made to move toward and from the saw by means of a screw G, journaled in an arm of F and working in a nut connected with the table, so that, being revolved by its hand-wheel or crank G', a very fine and accurate adjustment of the fence may be effected, which, with the quick and approximately correct setting of plate D for the greater changes of position, provides for the expeditious and exact adjustment of the gage. Also, by the telescopic arrangement of the two sliding parts D and F an increased range of action is secured in compact form, which, for purposes requiring considerable space, is of material advantage over a single movement; yet for some uses the secondary slide may not be required, and its use is in no wise essential to other features of my invention, which may be used either in connection with or independently of it. When only one sliding part is used, the base-plate D, with its tongue D', may be fitted to a recess in the table and used without the screw movement; or the plate D may be attached rigidly to the bed-piece F without the sliding tongue-and-groove connection. For the angular adjustment of the fence C, it is hinged to its base-plate D by means of curved or arc-shaped guide-ways or grooves and tongues of the ears or flanges H H', projecting from the base-plate D, and corresponding projections I I' of the fence-plate C. The curvature of these guide-ways is made concentric to the intersection of the planes of the vertical face of C and the surface of the table, making that the base-line of the fence at all inclinations, which, in making adjustments for beveled work, saves much time, trouble, and annoyance, and avoids the danger of the accidental thrusting of the fence against the saw as incident to ordinary beveling gages, in which the base-line changes at different inclinations.

For securing the fence at any desired inclination, a clamping-bolt J passes through the several ears H H' and I I' to bind them firmly together. Curved slots in I I' permit their movement while the bolt is held in convenient position by H H.

To facilitate the accurate placing and retaining of the fence in position of frequent use, as at angles of thirty, forty-five, sixty, and ninety degrees, I employ, in addition to bolt J, a locking-pin K, which is fitted to appropriate holes in parts H' and I', and by its proper insertion the fence may quickly and accurately set to a perpendicular or other special position for which it is provided.

L is a handle attached to fence C, and preferably projecting from the outer ear I', for turning it to different positions. The bed F is chambered or slotted throughout such portion of its length as may be necessary to provide space for the centrally-located ear I, where it drops below the seat of plate D.

As the application of my improvements to various uses involves modifications of form and construction, I do not limit myself to the precise form and arrangement which I have shown and described, but reserve the liberty of varying them to suit the exigencies of individual cases so far as may be expedient and consistent with the nature and spirit of the invention.

Having thus described my invention, what I claim as new, and desire to secure by Letters Patent, is—

The laterally and angularly adjustable plate C, hinged by curved or arc-shaped guideways to a base-plate D, in combination with a slotted or chambered bed or table adapted to receive the centrally-located hinge projection I, the whole being constructed and arranged substantially as shown and described.

In testimony whereof I affix my signature in presence of two witnesses.

BYRON S. LOVELAND.

Witnesses:
GEO. M. WHITNEY,
E. P. DAMON.